Jan. 13, 1970  H. HODARA  3,489,904
LASER BEAM TRACKING APPARATUS
Filed Oct. 18, 1965  2 Sheets-Sheet 1

INVENTOR
HENRI HODARA
BY Allen E. Botney
ATTORNEY

United States Patent Office 3,489,904
Patented Jan. 13, 1970

3,489,904
LASER BEAM TRACKING APPARATUS
Henri Hodara, Altadena, Calif., assignor to National
Engineering Science Company, Pasadena, Calif.
Filed Oct. 18, 1965, Ser. No. 496,763
Int. Cl. G01j *1/20;* H01j *39/12*
U.S. Cl. 250—203                                11 Claims

ABSTRACT OF THE DISCLOSURE

This invention makes it possible to quickly determine the angle at which a laser beam arrives at some receiver station, and the ability to measure this incoming angle offers the opportunity of automatically tracking laser beams. The desired results are achieved by measuring the wavefront inclination of the incident beam relative to a locally generated laser beam whose wavefront inclination is intentionally varied through an arc with time. Since the beam wavefront is definitely related to the incoming beam angle, any measurement of the angle between their wavefronts is also a measure of the difference between their respective beam angles.

---

The present invention relates in general to the laser field and more particularly relates to an electronic system for laser beam measurements and tracking.

In the use of laser beams, it is frequently desirable to know, or at least be able to quickly determine, the angle at which a particular laser beam is received at some station. Thus, as an example of the potential utility of such information, the ability to expeditiously and accurately measure this incoming angle of the beams offers the opportunity of automatically tracking laser beams. However, to date, there has not been any satisfactory way to provide these measurements.

The present invention overcomes this limitation and, in accordance with the basic concept of the invention, it does so by measuring the wavefront inclination of the incident beam relative to a locally generated laser beam whose wavefront inclination is intentionally varied through an arc with time. Since the beam wavefront is definitely related to the incoming beam angle, any measurement of the angle between their wavefronts is also a measure of the difference between their respective beam angles. More particularly, it is a well-known fact that the strength of the beat signal output from a photomixer depends on the relative angular alignment between the local oscillator signal (frequency $\omega_1$) and the incoming signal (frequency $\omega_2$) wavefronts. Thus, for rectangular geometry, the photomixer output beat current of the intermediatae frequency $\omega_1-\omega_2$ has an amplitude that is proportional to:

$$L \frac{\sin\left(\frac{\pi L}{\lambda}\sin\theta\right)}{\frac{\pi L}{\lambda}\sin\theta} \quad (1)$$

where $L$ is the photodetector length and $\theta$ the relative angular inclination between the local oscillator and signal wavefronts. Those skilled in the art will recognize from (1) that the beat current is a maximum when $\theta$ is zero degrees and is reduced significantly with but a slight angular misalignment between the two wavefronts of the order of $\theta_0 \sim \lambda/L$. The reduction taking place at the angle $\theta_0 \sim \lambda/L$ is significant independently of the geometry of the photodetectors and occurs when the phase difference between the incoming signal and the laser oscillator varies appreciably over its length L. It corresponds to a beam path difference between the two ends of the photodetector of the order of an optical wavelength or, stated differently, $L\theta_0 \sim \lambda$, thus yielding again $\theta_0 \sim \lambda/L$. For instance, if the photodetecting surface is 10 millimeters long, the beat output according to (1) reduces to zero for angular misalignments in the order of only 10 seconds of arc. Hence, by swinging the locally-generated laser beam through an arc that includes the incident laser beam, so that its wavefront moves in succession from misalignment, and again into misalignment, a variable detector output current is obtained with the peak value thereof indicating wavefront alignment. By knowing the angle at any moment of the local laser beam, it will be obvious, therefore, that the peak reading may also be used to provide an accurate indication of the angle of the incident beam.

The dependence of the beat strength on the relative angle between the local oscillator and the incoming signals can be explained as follows. At any instant, the beat output from an elementary area of the photocathode is proportional to the product of the amplitudes of both waves. Accordingly, if the waves have parallel wavefronts, this product has the same value over the entire photocathode length at any instant. On the other hand, if misalignment exists, the beat frequencies signal varies harmonically over the photocathode length at a spatial frequency that is determined by the inclination angle. This harmonic variation is due to periodic constructive and destructive interference of the field, the total beat output current being proportional to the square of the sum of all the partial field contributions from each elementary area. Since these contributions are alternately positive and negative and of equal amplitude, they tend to cancel in pairs, the net output current therefore being proportional to the square of the area of the uncancelled contribution, which is at most the last half cycle of the periodic spatial beat variation over the photocathode surface.

As previously mentioned, the ability to provide an output as a function of angle makes it possible to provide a laser beam tracker. The basic idea in any such system is to develop an error function that tends to restore the alignment between the two wavefronts. More specifically, according to a preferred embodiment of the invention, an electro-optic or mechanical scanner is provided that alternately switches or deflects the local oscillator beam of frequency $\omega_1$ to a positive angle of $+\theta$ and then to a negative angle of $-\theta$, the angle of the incoming beam being somewhere between $\pm\theta$. In accordance with the principls previously delineated, both beams are made to impinge upon a photodetector device with one beam superimposed upon the other at the photodetector surface with the result that, due to the aforesaid switching of the locally generated beam, a pair of beat output currents is obtained whose amplitudes may or may not be equal depending, respectively, on whether the incoming beam is centered between the deflected beams or inclined more toward one than the other. The detector is connected to a pair of channels in which peak detectors are alternately gated ON to respectively receive the pair of beat signals. Accordingly, each output is processed in a different channel, an error function corresponding to the difference in their magnitudes being subsequently developed that controls the static voltage of the electro-optic scanner until the local oscillator beams are symmetrically oriented with respect to the incoming signal. At this point the error function is reduced to zero. By suitably calibrating the equipment, the angle of arrival of the signal with respect to one of the beams can be read off with accuracies better than $10^{-3}$ radians.

It is, therefore, an object of the present invention to provide a system for automatically tracking laser beams and the sources thereof.

It is another object of the present invention to provide the means by which the angle of the wavefront of an incoming laser beam may be measured with a high degree of accuracy.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
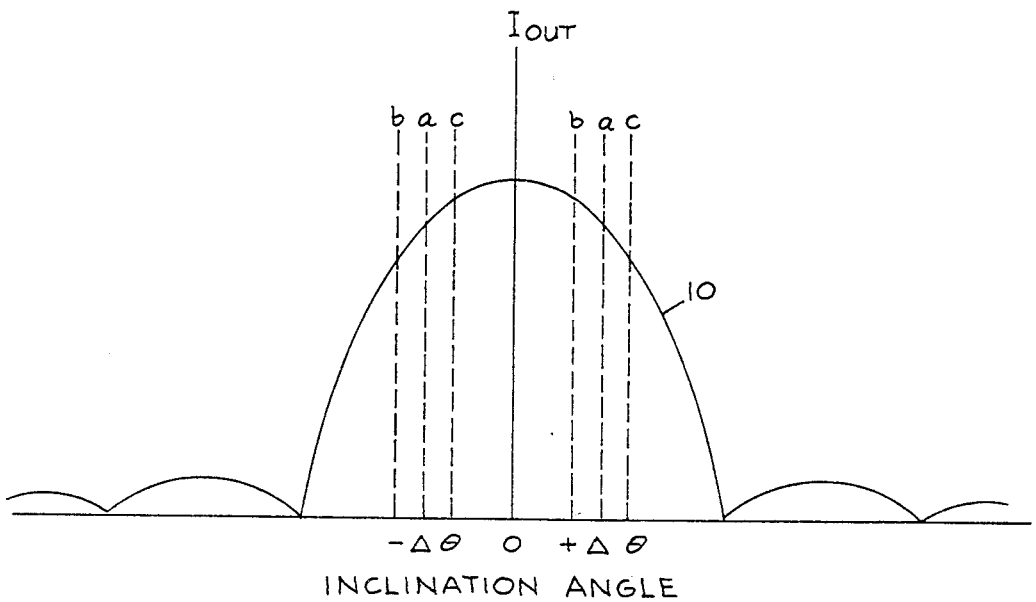
FIG. 1 is a curve that illustrates the variations of beat output as a function of inclination angle.

For a consideration of the invention in detail, reference is now made to the drawings wherein like or similar parts or elements are given like or similar designations throughout the several figures. Referring first to FIG. 1, a curve or loop 10 is shown therein which indicates the manner in which current out of a photodetector varies with the angle between the wavefronts of a pair of laser beams incident thereon. Stated differently and more concisely, curve 10 illustrates the variations in the magnitude of the beat current obtained as a function of the inclination angle between a pair of laser beams that are heterodyned together. As may be seen from the figure, the current signal is a peak or maximum when the two laser beams are received at the same angle, that is to say, when the beams have parallel wavefronts, and drops away sharply to zero as the angle between their wavefronts is increased. As may also be seen, the curve is symmetrical which merely means that only the absolute value of the angle between the beams is significant and that it is immaterial to the photodetector in terms of its output whether one beam leads or lags the other.

Figure 2:
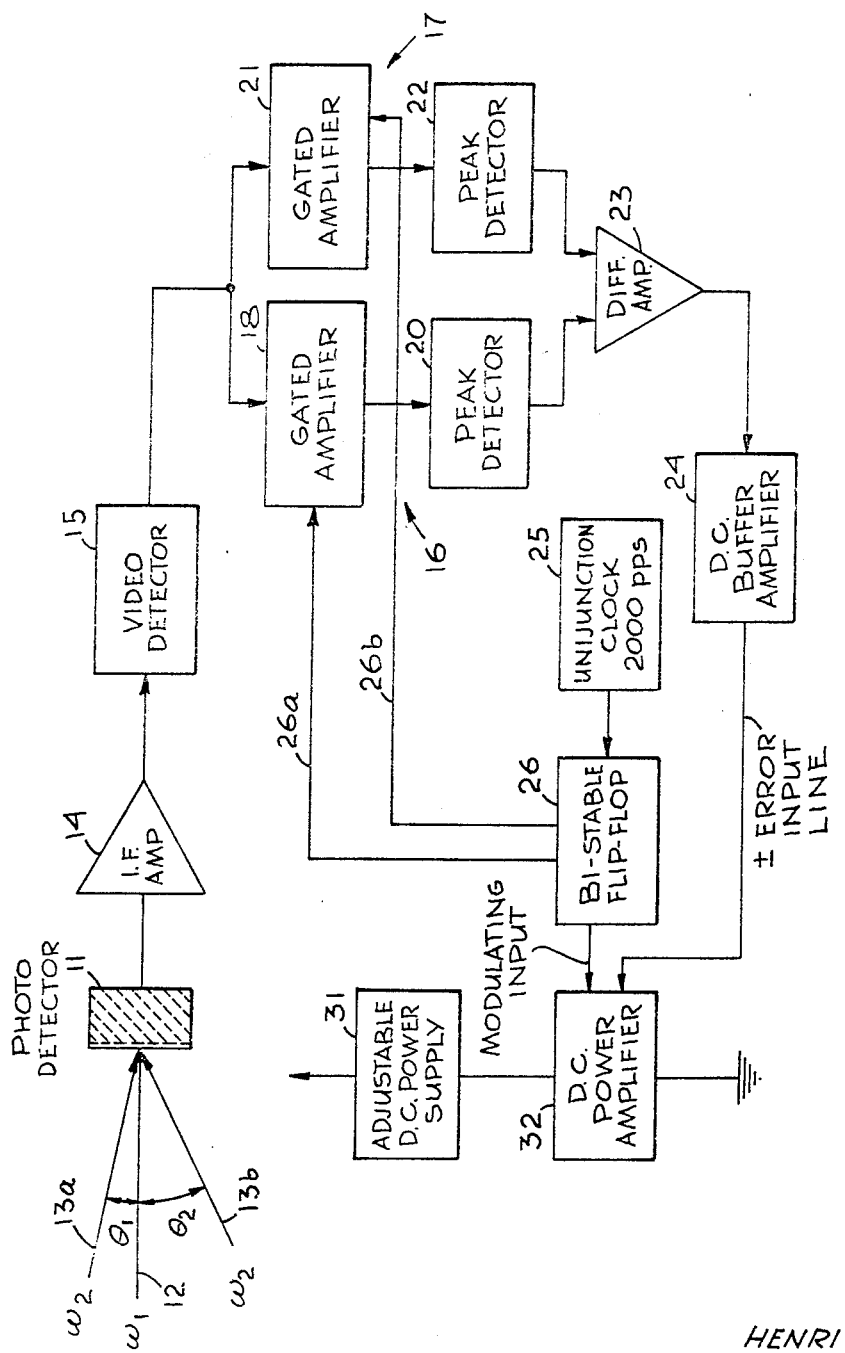
FIGURE 2 is an embodiment of a tracking system according to the present invention.

Referring now to FIG. 2, the embodiment therein is shown to include a photodetector element 11 against whose surface a pair of laser beams impinge. These laser beams are represented in the figure by means of arrows having the legends $\omega_1$ and $\omega_2$ and the reason why two arrows are presented having the legend $\omega_2$, one on either side of the arrow having the legend $\omega_1$, will be more clearly understood when the systems operation is described. Suffice it to say for the present that, for purposes of clarity later, the arrow having the legend $\omega_1$ is designated 12 and the arrows having the legend $\omega_2$ are respectively designated 13a and 13b. Photodetector 11 is connected to a beat frequency I.F. amplifier 14 which, in turn, is connected to a video detector circuit 15.

At this point, the video detector connects to a pair of identical channels generally designated 16 and 17, each channel including a gated amplifier and a peak detector. Thus, channel 16 includes a gated amplifier 18 that is connected between video detector 15 and a peak detector 20. Similarly, channel 17 includes a gated amplifier 21 that is likewise connected between video detector 15 and a peak detector 22. It is thus seen that whatever signal is produced by the video detector is simultaneously applied to both channels and, specifically, to the gated amplifiers therein. As is shown in the figure, the output ends of both these channels are respectively connected to the two inputs to a differential amplifier 23 which, as its name implies, produces an output signal that corresponds to the difference between the signals applied to it. The differential amplifier is connected to a standard D.C. buffer amplifier 24.

In accordance with the basic concept of this embodiment, there is also included a clock-pulse generator 25 which preferably, but not necessarily, generates clock pulses at the rate of 2000 per second. Clock-pulse generator 25 is connected to a bistable flip-flop 26 which has a pair of output lines, designated 26a and 26b, respectively connected to gated amplifiers 18 and 21. As will be recognized by those skilled in the art, if clock-pulse generator 25 puts out 2000 pulses per second, then two identical pulse trains will respectively appear on lines 26a and 26b at a pulse rate of 1000 pulses per second and 180 degrees out of phase with one another.

Figures 3A, 3B:
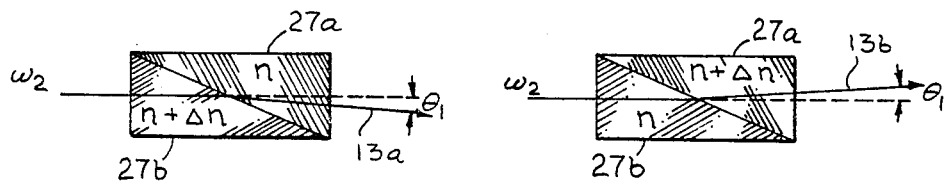
FIGURES 3a–3c show an electro-optic scanner that may be used in the system of FIG. 2.
Figure 3C:
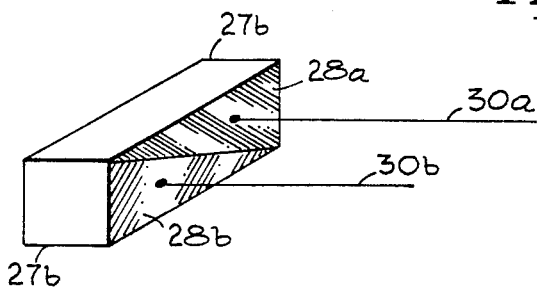

At this point, it would be well to consider the electro-optic scanner and for this purpose reference is made to FIGS. 3(a)–3(c) where one type of scanner is shown that may be utilized herein. More specifically, the scanner basically includes, but not necessarily, two triangular-shaped prisms, respectively designated 27a and 27b, that are made of a crystal material that exhibits a linear electro-optical characteristic and that are mounted to butt against each other as shown in the figures. The prisms are biased so as to provide refractive index changes of $\pm \Delta n$ of one prism with respect to the other and, in order that this may be achieved, the faces of the prisms are respectively coated with silver-plated electrodes. The electrode on the face of prism 27a is designated 28a and the electrode on the face of prism 27b is designated 28b, the bias being applied via a pair of leads 30a and 30b respectively connected to electrodes 28a and 28b.

Considering the matter still further, if $n$ is the unstressed refractive index of the prisms, then by applying a suitable biasing voltage between leads 30a and 30b the refractive index of prism 27b is increased by $\Delta n$ to $n+\Delta n$. If now, in FIG. 3(a), the arrow with the legend $\omega_2$ attached to it represents a laser beam, such as the locally generated laser beam heretofore mentioned, then because of the difference in the refractive indices of the two prisms through which the laser beam has to pass, the beam is bent downward from the horizontal by an angle $\theta$, as is indicated by the arrow 13a which represents the refracted beam. Arrow 13a in FIG. 3a is the same as arrow 13a in FIG. 2 and, therefore, arrow 13a in FIG. 2 represents a locally generated laser beam that has been swung in one direction through an angle of $+\theta$ degrees by the scanner before impinging upon the surface of the photodetector element. By reversing the polarity of the bias voltage, the refractive indices of the prisms are likewise reversed so that the refractive index of prism 27b is restored to $n$ while that of prism 27a is increased to $n+\Delta n$. Under these conditions, the beam is bent upward from the horizontal by an angle $\theta$, as is indicated in FIG. 3(b) by the arrow 13b which represents the refracted beam. Arrow 13b in FIG. 3(b) is the same as arrow 13b in FIG. 2 and, therefore, arrow 13b in FIG. 2 represents a locally generated laser beam that has been swung in the reverse direction through an angle of $-\theta$ degrees by the scanner before impinging upon the surface of the photodetector element.

It should be noted by way of example that ADP crystals may be used for prisms 27a and 27b and that such material has an unstressed refractive index $n$ of 1.52 and an electro-optic coefficient $r$ (in cm./volts) of $2.1 \times 10^{-9}$ cm./volts. Accordingly, if the prisms were constructed out of this material, then for a deflection angle $\theta$ of approximately $0.5 \times 10^{-2}$ radians, the required bias voltage is approximately 1000 volts.

Returning now to FIG. 2, the embodiment therein finally includes an adjustable D.C. power supply 31 which is connected to apply the necessary bias voltage to the scanner, and D.C. power amplifier 32 which is connected between the power supply unit and both flip-flop 26 and buffer amplifier 24. With respect to power supply 31, it is connected to the electro-optic scanner of FIG. 3 via leads 30a and 30b and is operable in response to the action of the flip-flop to apply its biasing voltage to either one or the other of these leads and, therefore, in one polarity or the other to prisms 27a and 27b. The power supply is also adjustable in the sense that it constantly applies a varying D.C. corrective voltage to the scanner in response to the error signal developed by differential amplifier 23 as hereinafter described.

Considering now the operation, clock pulse generator 25 generates a continuous train of clock pulses at a predetermined rate. Using the figures illustratively cited previously, the generator may, for example, produce these clock pulses at the rate of 2000 pulses per second. These clock pulses are applied to flip-flop circuit 26 which, in response thereto, produces two trains of rectangular pulses that are identical but 180 degrees out of phase with one another. Stated differently, in response to the clock pulses, flip-flop 26 alternately applies a voltage of constant amplitude to its output lines 26a and 26b, the voltage being applied to these leads for equal periods of time. By way of example, if the clock pulse rate is 2000 p.p.s., then the pulse repetition rate of the pulse trains out of the flip-flop and appearing on lines 26a and 26b is 1000 c.p.s. Gated amplifiers 18 and 21 are normally in an OFF condition, by which is meant that they are normally in a state where they will not pass signals applied to them. However, in response to the aforesaid pulse trains out of flip-flop 26, the gated amplifiers are alternately activated to an ON condition and during these ON intervals signals respectively applied to them are passed to the circuits that follow. Thus assuming a pulse repetition rate of 1000 c.p.s., the gated amplifiers are alternately placed in an ON condition 1000 times per second and for equal intervals of time.

The pulse trains produced by the flip-flop circuit are also applied to power amplifier 32 wherein they are amplified and thereafter applied to adjustable D.C. power supply 31. As a result, the power supply applies a biasing voltage alternately to leads 30a and 30b and, therefore, alternately to electrodes 28a and 28b of prisms 27a and 27b, respectively. If the pulse repetition rate for each of the pulse trains produced by the flip-flop is 1000 c.p.s., a figure previously mentioned by way of example, then the above-said biasing voltage would likewise be applied 1000 times per second to each of the prisms, but alternately. As a still further example, if the prisms are made of ADP crystals and if beam deflections of $0.5 \times 10^{-2}$ radians are desired, then 1000 volts would be applied 1000 times a second to each of the prisms. Accordingly, for reasons previously explained, any laser beam projected onto the scanner would alternately be refracted in one direction and the other and, therefore, the beam emerging from the scanner would alternately be switched between deflections of $\pm \theta$. As would be expected, the beam deflection rate would be one-half the clock pulse rate, i.e., 1000 deflections per second in each direction in the example used.

In FIG. 2, arrows 13a and 13b represent the laser beam out of a local laser oscillator that has already been passed through the scanner of FIG. 3 and, therefore, alternately deflected at the prescribed rate of $\pm \theta$ degrees. Arrow 12, on the other hand, represents an incoming laser beam received from some distant source and as may be seen from the figure, the system parameters are such that incoming beam 12 lies between the deflected positions of local beam 13. These beams are focused onto the same surface area of photodetector 11 and, as a result, a series of intermediate frequency current pulses are obtained at the photodetector output, the magnitude of each such I.F. pulse depending, as previously explained, on the angle between the beam wavefronts existing at the time. More specifically, the mixing of beam 12 with beam 13a results in a video pulse whose magnitude is determined by their wavefronts' relative inclination, and, alternately, the mixing of beam 12 with beam 13b results in another video pulse whose magnitude is likewise determined by the beam wave-front inclination. These video pulses are then amplified in I.F. amplifier 14 and then detected by video detector 15 to produce a series of corresponding voltage pulses whose amplitudes are likewise determined by the same beam wavefronts. These voltage pulses are applied to gated amplifiers 18 and 21 which, it will be recognized, are alternately activated to an ON condition in synchronism with the deflections of beam 13. Consequently, the pulses produced by video detector 15 will at all times be passed by one or the other of the gated amplifiers. Thus, for example, the pulses produced by detector 15 in response to the mixing of beams 12 and 13a are respectively passed through gated amplifier 18 to peak detector 20 and those produced in response to the mixing of beams 12 and 13b are respectively passed through gated amplifier 21 to peak detector 22.

As their names imply, peak detectors 20 and 22 produce voltage signals at their respective outputs that correspond to the peak values of the pulses applied to them. These voltage signals are then fed to differential amplifier 23 which, as is well known, produces an output voltage whose amplitude at any instant is proportional to the difference in the amplitudes of the voltage signals applied to it. Hence, if the voltages applied to the differential amplifier are equal, then it will have a zero output. On the other hand, if one of the signals applied to the differential amplifier is greater than the other, then it will produce an output signal of either positive or negative polarity depending on which of channels 16 and 17 has produced the greater signal.

Considering this in relation to the tracking of the incoming laser beam, namely, beam 12, reference is once again made to FIG. 1 wherein vertical broken lines a—a, b—b than that and c—c are shown superimposed on curve 10 which it, in this will be remembered, is a plot of photodetector and, therefore, of video detector output vs. beam inclination angle. As may be seem from the figure, lines a—a are equidistantly spaced from the vertical axis on either side thereof and, therefore, they represent the situation where the inclination angle between beams 12 and 13a at the time they are mixed is equal to that between beams 12 and 13b. Accordingly, the ordinates of curve 10 determined by lines a—a are equal, which means that the amplitudes of the signals passed through gated amplifiers 18 and 21 are also equal. In turn this means that the voltages respectively applied to differential amplifier 23 by peak detector circuits 20 and 22 are likewise equal with the result that the amplifier output under these circumstances is zero. On the other hand, lines b—b represent the situation where one inclination angle is greater than the other, for example, where the inclination angle between beams 12 and 13a is larger than that between beams 12 and 13b. Under these conditions, the ordinates of curve 10 determined by lines b—b are unequal so that, ultimately, the voltage applied by peak detector 20 to the differential amplifier is of greater amplitude than that applied to the amplifier by peak detector 22. In this latter case, therefore, the differential amplifier produces an output signal of one of the two possible polarities, of positive polarity for example. Similarly, lines c—c represent the situation where the inclination angle between beams 12 and 13a is smaller than that between beams 12 and 13b. Correspondingly, therefore, the amplitude of the voltage applied by peak detector 20 to differential amplifier 23 is smaller than that of the voltage applied by peak detector 22. Hence, in this third and last case, the differential amplifier produces an output signal of negative polarity.

The signal produced by differential amplifier 23, whatever its magnitude and polarity, is applied to power amplifier 32 wherein it is amplified and which then applies it to adjustable D.C. power supply 31. As a result, the bias applied to electro-optical prisms 27a and 27b by the power supply are adjusted until both deflection angles relative to beam 12 (angles $\theta_1$ and $\theta_2$ in FIG. 2) are equal or, stated differently, until both inclination angles are equal, at which time the differential amplifier output is reduced to zero. Thus, the signal out of the differential amplifier is an error function that tends at all times to center incoming beam 12 between deflected beams 13a and 13b, that is to say, it tends at all times to restore the alignment between the wavefronts of incoming beam 12 and locally-generated beam 13. It will be recognized by those skilled in the art that by appropriately calibrating the equipment, the angle of arrival of laser beam 12 with respect to one of the deflected beams can be read with considerable accuracy. It is expected that with this invention accuracies of better than $10^{-3}$ radians can be attained.

It should be mentioned at this point that although the preceding description was for misalignment in only one plane, it is equally applicable and easily adaptable to misalignment in two planes. For example, in the case of rectangular geometry, if misalignment exists in two planes, that is to say, with respect to angles $\theta_x$ and $\theta_y$, then the beat output current has an amplitude that is proportional to:

$$L_x L_y \frac{\sin \frac{\pi}{\lambda} L_x \sin \theta_x}{\frac{\pi}{\lambda} L_x \sin \theta_x} \frac{\sin \frac{\pi}{\lambda} L_y \sin \theta_y}{\frac{\pi}{\lambda} L_y \sin \theta_y} \qquad (2)$$

Although a particular arrangement of the invention has been illustrated and described above by way of example, it is not intended that the invention be limited thereto. More specifically, the same results can be obtained by moving the photodetector through an angle together and in unison with the locally generated beam until the local beam is lined up with the incoming beam. The angle through which the detector is moved is then equal to or related to the angle of incidence of the incoming beam. The servo-system for control of the detector movement can be of the same kind shown in FIG. 2. Accordingly, the invention should be considered to include any and all modifications, alterations or equivalent arrangements falling within the scope of the annexed claims.

Having thus described the invention, what is claimed is:

1. Apparatus for tracking an incoming laser beam with a locally generated laser beam, said apparatus comprising: A photodetector element positioned so that the incoming laser beam impinges upon a surface area thereof; means for alternately deflecting the locally-generated laser beam to one side and the other of the incoming beam, said means including additional means for at all times directing the locally-generated laser beam onto the same surface area of said photo-detector element, said photo-detector element being operable in response to the mixing of said overlapping laser beams to produce beat signals whose amplitudes respectively correspond to the angles between the incoming laser beam and the alternately deflected locally-generated laser beam; and a network coupled between said photo-detector element and said means for varying the deflections of the locally-generated laser beam in response to the differences in amplitudes of said beat signals until they are equal.

2. Apparatus used in tracking an incoming laser beam with a locally-generated laser beam, said apparatus comprising: A photo-detector element positioned so that the incoming laser beam impinges upon a surface area thereof; means for alternately deflecting the locally-generated laser beam to one side and the other of the incoming beam, said means including additional means for at all times directing the locally-generated laser beam onto the same surface area of said photo-detector element, said photo-detector element being operable in response to the mixing of said overlapping laser beams to produce beat signals whose amplitudes respectively correspond to the angles between the incoming laser beam and the alternately deflected locally-generated laser beam.

3. The apparatus defined in claim 2 wherein said means includes a pair of abutting prisms having linear electro-optical qualities and whose faces thereof respectively have silver-plated electrodes thereon to which deflection voltages may be applied.

4. Apparatus for tracking an incoming laser beam with a locally-generated laser beam, said apparatus comprising: A photo-detector element; means for directing the incoming and locally-generated laser beams onto a surface area of said photo-detector element, said element being operable in response thereto to produce a beat signal whose amplitude varies as the angle between the wave fronts of the beams; an electro-optic scanner for alternately deflecting the locally-generated laser beam to one side and the other of the incoming beam, said photo-detector element being operable to produce first and second trains of said beat signals that respectively correspond to said deflections of the locally-generated laser beam to one side and the other of the incoming signal; a network for comparing the amplitudes of succeeding pairs of signals in said first and second trains of signals, said network including a circuit for producing a voltage whose magnitude and polarity varies as the difference in the amplitudes of the signals in said trains; and control apparatus connected between said circuit and said scanner, said control apparatus being operable in response to said voltage to adjust the deflections of the locally-generated laser beam made by said scanner until said deflections are symmetrical with respect to the incoming beam.

5. The tracking apparatus defined in claim 4 wherein said network includes first and second channels that are alternately gated On and Off in synchronism with the signals of said first and second signal trains, said first and second channels respectively including first and second peak detector circuits that respectively receive said first and second trains of signals to produce corresponding first and second voltages.

6. The tracking apparatus defined in claim 4 wherein said circuit is a differential amplifier having first and second inputs thereto.

7. The tracking apparatus defined in claim 4 wherein said network includes first and second channels that are alternately gated On and Off in synchronism with the signals of said first and second signal trains, said first and second channels respectively including first and second peak detector circuits that respectively receive said first and second trains of signals to produce corresponding first and second voltages; and wherein said circuit is a differential amplifier having first and second inputs thereto that are respectively connected to said first and second peak detector circuits to receive said first and second voltages therefrom.

8. Apparatus for use in tracking an incoming an incoming laser beam with a locally-generated laser beam, said apparatus comprising: A photo-detector element; a video detector circuit connected to said photo-detector element; means for directing the incoming and locally-generated beams onto a surface area of said photo-detector element, said element being operable in response thereto to produce a beat signal whose amplitude varies as the angle between the wave fronts of the beams; a scanner device for alternately deflecting the locally-generated laser beam to one side and the other of the incoming beam, said photo-detector element being operable in response to said beam deflections to product first and second trains of said beat signals, said video detector circuit receiving said trains of signals and being operable in response thereto to produce corresponding first and second trains of voltage pulses; and control means connected to receive said first and second trains of voltage pulses, said control means being adapted to compare the amplitudes of the voltage pulses therein to produce a correction voltage whose magnitude and polarity varies as the difference in the amplitudes of said voltage pulses.

9. The tracking apparatus defined in claim 8 wherein said control means includes first and second channels that are alternately gated On and Off in synchronism with the beat signals of said first and second signal trains, and first and second channels respectively including first and second peak detector circuits that respectively receive said first and second trains of signals to produce corresponding fist and second voltages; and a differential amplifier having first and second inputs thereto that are respectively connected to receive said first and second voltages to produce said correction voltage.

10. The tracking apparatus defined in claim 8 wherein said means includes a pair of abutting prisms whose indices of refraction may be linearly varied with deflection voltages respectively applied thereto, the faces of said prisms respectively being coated with electrically-conducting materials as electrodes to which said deflection voltages may be applied; and oscillator means alternately generating first and second trains of deflection pulses, said oscillator means being connected to said electrodes for respectively applying said first and second trains of deflection pulses thereto to alternately increase and decrease the indices of refraction of said prisms.

11. The tracking apparatus defined in claim 10 wherein said control means is coupled to said oscillator means to apply said correction voltage thereto, said oscillator means being operable in response to said correction voltage to vary the amplitudes of said deflection voltages in accordance with the variations in magnitude and polarity of said correction voltage.

References Cited
UNITED STATES PATENTS

| | | | |
|---|---|---|---|
| 3,258,597 | 6/1966 | Forrester | 250—199 |
| 3,350,654 | 10/1967 | Snitzer | 250—217 X |
| 3,363,104 | 1/1968 | Waite et al. | 250—217 X |

OTHER REFERENCES

A. T. Forrester: "Photodetection and Photomixing of Laser Outputs," Advances in Quantum Electronics, 1961, pp. 233–238.

A. T. Forrester: "Photoelectric Mixing As A Spectroscopic Tool," J. of the Optical Society of America, vol. 51, No. 3, March 1961, pp. 253–259.

S. H. Logue: "Tests of a Laser Interferometric Angle Tracker," IEEE Proc. Internat'l Conv. Military Electronics, 1964, pp. 58–61.

V. J. Corcoran: "The Directivity of Coherent Optical Doppler Receivers," IEEE Proc. Int. Conv. Mil. Elec., 1964, pp. 62–65.

RALPH G. NILSON, Primary Examiner

M. A. LEAVITT, Assistant Examiner

U.S. Cl. X.R.

250—214, 217, 220; 331—94.5